March 27, 1951  J. TROUIN  2,546,202
APPARATUS FOR PROTECTION AGAINST FALLS INTO SPACE
Filed March 31, 1939  3 Sheets-Sheet 1
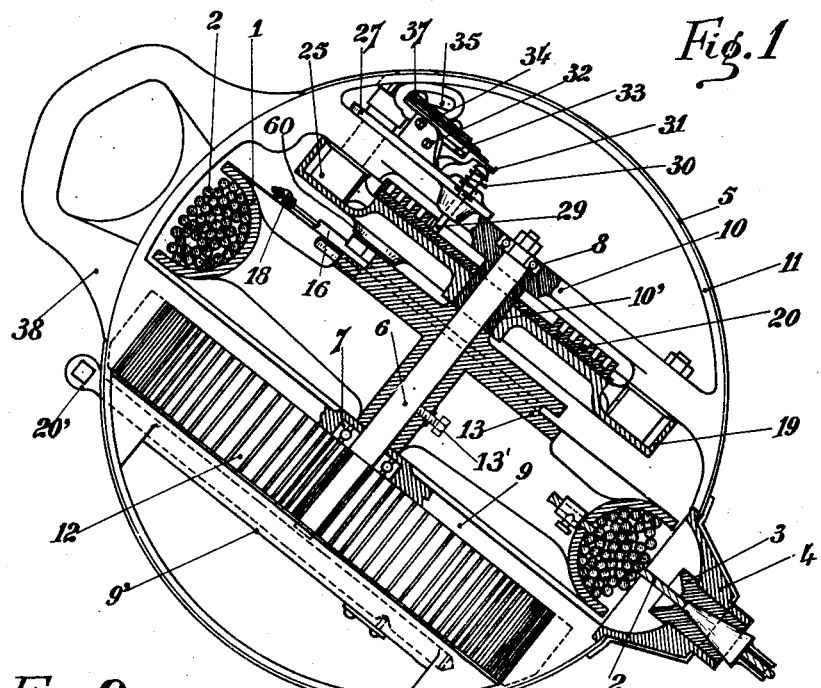
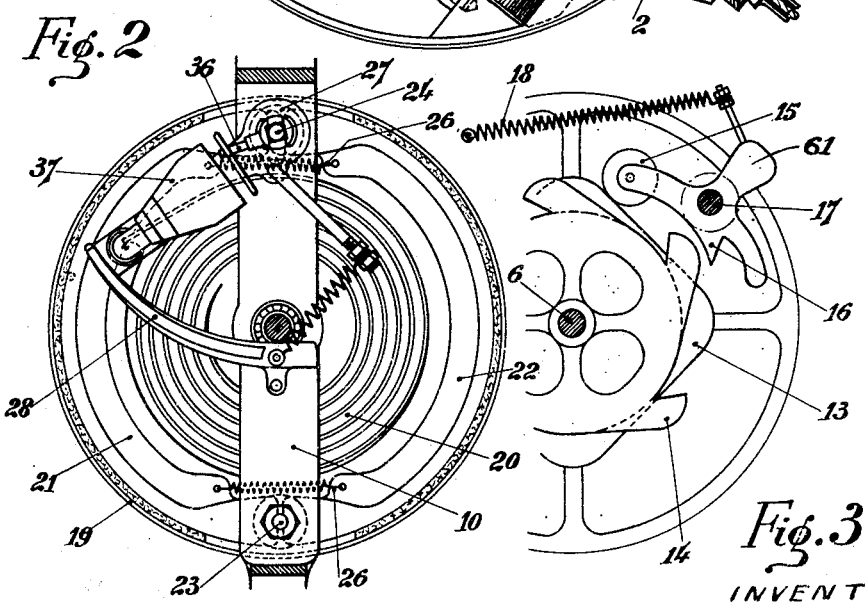
INVENTOR.
Joseph Trouin
By
Rotic & Bastien.
Attys.

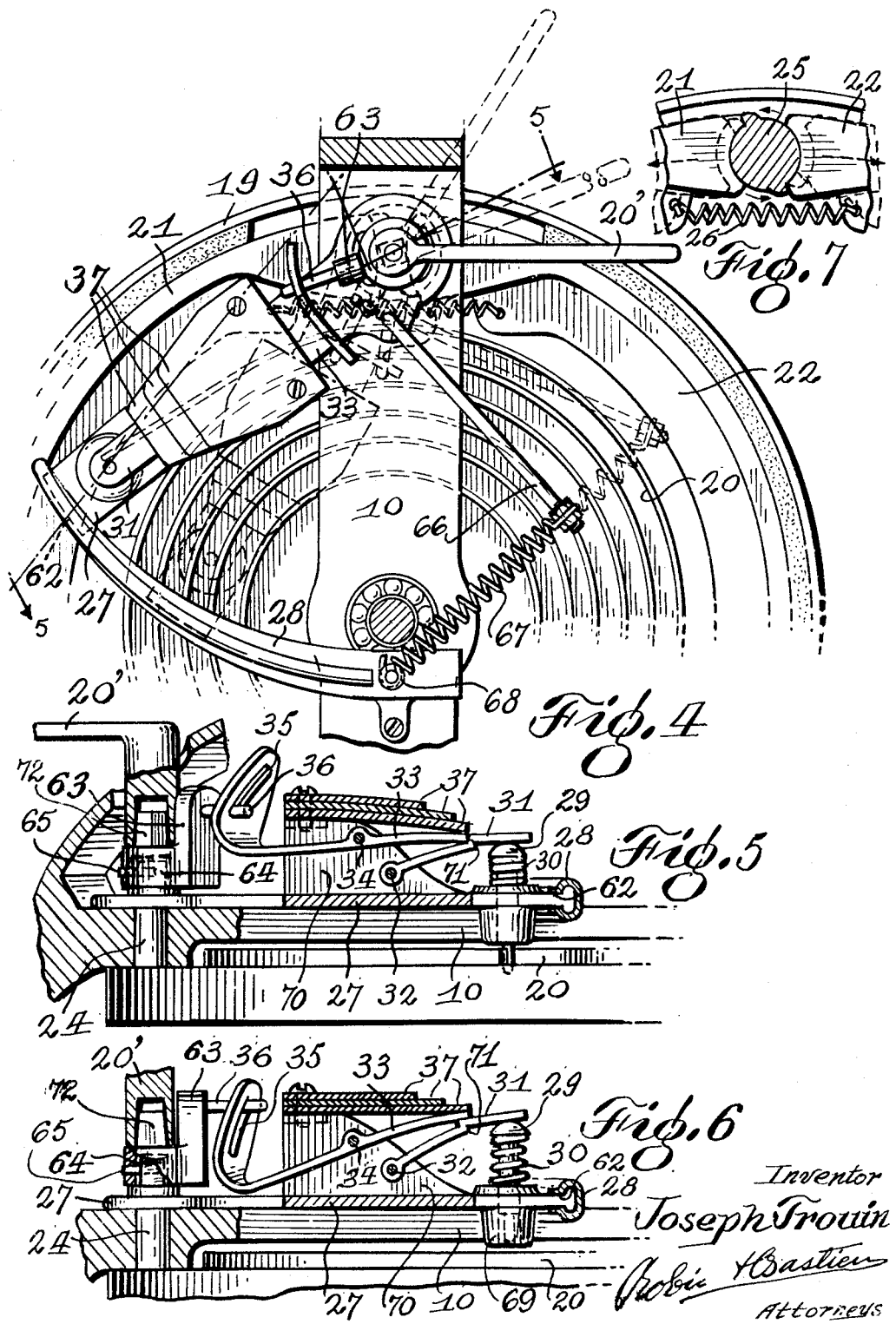

March 27, 1951 J. TROUIN 2,546,202
APPARATUS FOR PROTECTION AGAINST FALLS INTO SPACE
Filed March 31, 1939 3 Sheets-Sheet 3
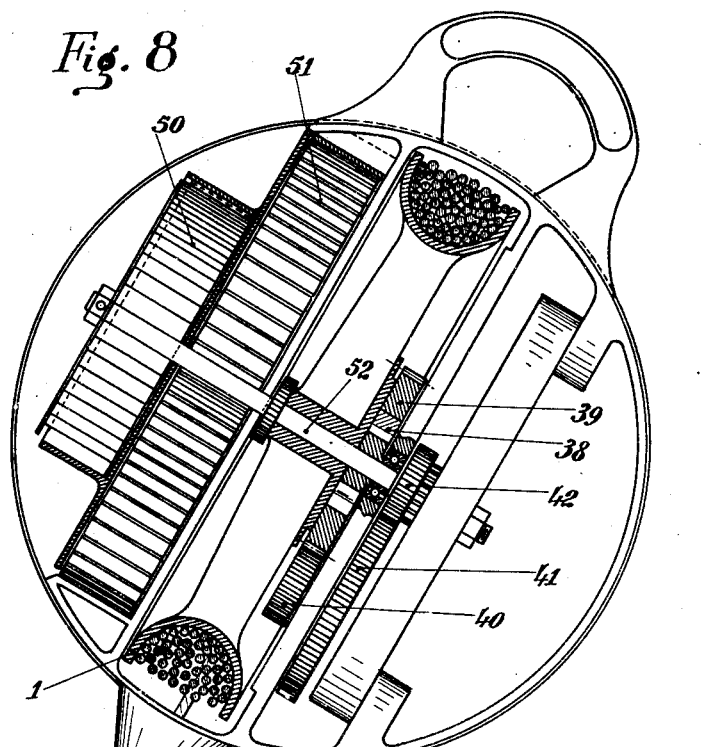
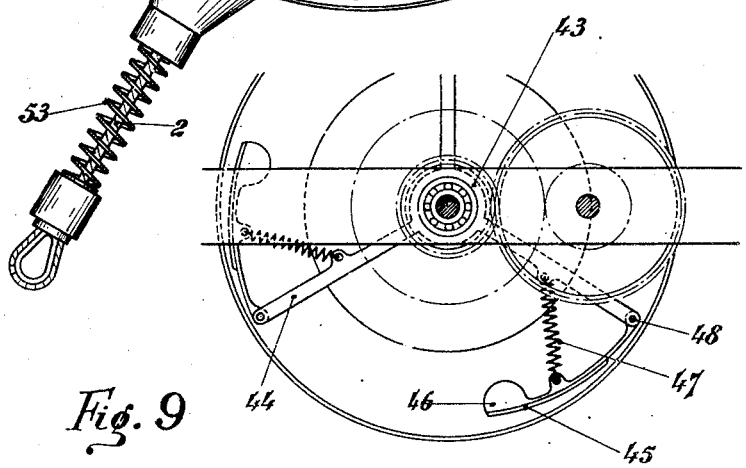
INVENTOR.
Joseph Trouin.
By Rotic & Bastien.
Attys.

Patented Mar. 27, 1951

2,546,202

UNITED STATES PATENT OFFICE 2,546,202

APPARATUS FOR PROTECTION AGAINST FALLS INTO SPACE

Joseph Trouin, Villeurbanne, France

Application March 31, 1939, Serial No. 265,369
In France April 2, 1938

Section 3, Public Law 690, August 8, 1946
Patent expires April 2, 1958

3 Claims. (Cl. 254—153)

The present invention has for its object to provide an apparatus designed to protect in an efficient manner persons who are exposed to falls into space such, for example, as certain builders, firemen, mountaineers, etc.

The apparatus consists essentially in a winding gear in which the normal winding of the cable is carried out by a spiral spring and in which the sharp drawing back of the cable in the case of the falling of the user to whom it is attached, causes the braking of a drum and, consequently, by an interlocking arrangement, the stoppage or the progressive breaking of the fall.

The annexed drawings show, by way of example, two constructional forms of the invention.

On the drawings:

Fig. 1 is a view in elevation, partly in section, of an apparatus causing the stoppage of a fall;

Fig. 2 is a side view of the cheek comprising the spiral spring control groove for the progressive braking of the drum;

Fig. 3 is a detail view of the braking control ratchet of the winding gear;

Figure 4 is an enlarged plan view of the upper part of Figure 2;

Figure 5 is a longitudinal section on line 5—5 through the mechanism of Figure 4, showing said mechanism in locked position;

Figure 6 is a view similar to Figure 5 and showing the mechanism unlocked for manual operation of the brake;

Figure 7 is an enlarged plan view of the brake shoes operating cam;

Figure 8 is a view in section and elevation of a modified form of the invention, and Figure 9 is a detail view of the progressive braking means of the form shown in Figure 8.

The fall-stopping apparatus illustrated in Figs. 1 to 6 comprises a winding gear drum 1, the groove in which receives the windings of a cable 2. The latter passes into a guide 3 mounted in a cone 4 integral with the two-part spherical casing 5, in which the mechanism is housed.

The drum 1 is fixedly mounted on a shaft 6 which is carried by two ball bearings 7 and 8 housed in two supports 9, 10 integral with a frame 11, on which are seated the two covers or domes of the casing 5.

On the shaft 6 is fixed the inner end of a spiral spring 12, which is attached at the other end to the frame 11 so as, by the rotational movement impressed on the drum 1, to control automatically the automatic winding of the cable 2.

The hub of the winding drum 1 comprises two cams 13, 14, the cam 13, which is of square form with rounded corners, having rolling upon it a roller 15 operating a pawl 16 that oscillates around a shaft 17, said shaft being mounted on the boss 60 integral with the under surface of the drum 19 (see Fig. 1). The pawl 16 is urged back by a spring 18, also attached to the drum, so that the roller 15 is normally held in contact with cam 13. As the drum 1 is slowly rotated, when the cable is slowly unwound therefrom, the roller will follow the contour of 13 and raise the pawl 16 in time to clear the teeth 14. As the rotational speed of the cam 14 is increased, however, the inertia of the weight 61 will slow down the movement of the roller and, accordingly, cause pawl 16 to engage the teeth 14, thereby locking the drums 1 and 19 together: this action is controlled by the tension of the spring 18.

The shaft 6 passes through a bearing 10' formed in the support 10 and serving as a bearing for the brake drum 19 which comprises externally a spiral groove 20. Two brake shoes 21, 22 anchored at 23 operate in the drum 19. On the support 10 there is rotatably mounted a shaft 24 carrying a cam 25 adapted to move the brake shoes 21, 22 apart, the shoes being drawn back one against the other by two springs 26.

A lever 27 secured to and extending radially from shaft 24 is guided at its free end and in the slot 62 formed in the side of an arcuate arm 28 attached to support 10, as shown in Figs. 2 and 4. A pin 29 is freely mounted in a boss 69 provided at the end of the arm and adapted to engage the spiral 20 of the drum 19. A spring 30 urges the pin upwardly and out of engagement with the spiral, for a purpose to be explained later.

A medially offset finger 31 is pivoted at 32 on upstanding ribs 70 bent laterally from the sides of lever 27 (one of such ribs being shown in Figs. 5 and 6) and the finger is pressed against the pin 29, by the flat spring leaves 37, through the intermediary of lock lever 33. As shown to advantage in said Figures 5 and 6 the lever 33 is pivoted at 34 and is adapted to rest against the offset shoulder 71 of 31 so as to lock, normally, the said finger against lifting. The rear end of lever 33 is bent upwardly and formed with an inclined cam groove 35 in which the pin 36 is slidably engaged: said pin is integral with a block member 63 formed at the end of a hub 64 mounted on the shaft 24 and movable therewith. For a purpose to be evident later, there must exist a certain play between shaft 24 and hub 64: this may be obtained by mounting 64 on the squared end of 24 in a loose manner and loosely pinning at 65 the former on the latter to prevent relative longitudinal displacement.

Under the action of the spring 37, the lever 33 always keeps the pin 29 bearing against the spiral 20. A socket-wrench 20', disposed in a support 9', is engaged on the squared projection 72 of 63 so as to permit the disengagement of the pin 29 from spiral 20. This is accomplished by the initial free movement of 63 which, moving pin 36 in slot 35, will raise lock lever 33, the spring leaves 37 and release the finger 31; thereafter, the pin 29 will be free to be disengaged from spiral 20 under the action of spring 30. Thus, the cam 25 will now be under control of the operator who, through the intermediary of the wrench, can apply or release the brake at will for lowering gradually to safety the person suspended in space at the end of the cable.

The frame 11 is provided with a shackle 38 by which the apparatus is hooked at a fixed point and the cable 2 is attached to the belt of the user, the movements of whom the cable can follow without inconvenience due to the tension of the cable 2 by the action of the return spring 12.

When the cable 2 is pulled sharply in consequence of a fall, it causes the cam 13, 14 to rotate rapidly and thus causes the engagement of the pawl 16 in the teeth of the cam 14, the pawl not having had time to be drawn back by the spring 18. The result is the rotation of the brake drum 19 by the pawl 16 and, consequently, the displacement of the pin 29 in the spiral groove 20, which also turns.

The progressive spacing of the brake shoes 21, 22 takes place through the cam 25, which is operated by the lever 27. The result is the progressive braking of the winding drum 1 of the winding gear.

In order to permit the unwinding of the cable 2 at will, it is necessary to act directly on the shaft 24 by means of the wrench 20' after the latter has been withdrawn from its housing in the support 9'.

The device shown in Figs. 7 and 8 brings about the progressive braking of the cable 2 without causing the stoppage of the winding gear. It comprises the parts of the apparatus described above with the exception of the spiral groove and its brake control.

By the aid of a free wheel 38 and of a set of gears 39, 40, 41, 42, the drum 1 drives a hub 43 comprising three branches 44, each of which is provided with a brake shoe having a mass 46 and return spring 47. Each branch 44 pivots around an axis 48.

When the cable 1 is unrolled from the apparatus, the brake shoes are driven by the free wheel 38 and the gears 39 to 42. The braking is carried out progressively under the action of centrifugal force, which displaces the masses 46. The result is that the fall of the person suspended by the cable takes place at a slackening speed.

When the cable 2 is left to itself, it is returned by the springs 50, 51 which, without driving the gears 39 to 42, turn the shaft 52, the latter turning loosely within the free wheel 38. A spring 53 absorbs the end of the travel of the cable 2.

I claim:

1. Safety braking device of the character described, comprising a freely mounted cable drum adapted to receive a cable, a cable attached at one end to said drum and urged to a wound position thereon by a spring on the drum, a brake drum freely mounted adjacent the cable drum, stationary brake shoes disposed inside the brake drum, ratchet means between the two drums for locking them together above a given rotational speed of the cable drum, a lever adapted to operate the brake shoes, a spiral groove on the brake drum, means on the lever for engaging the groove and actuate the brake shoes, and manual means for disengaging the lever groove-engaging means to release the brake shoes.

2. In a safety device as claimed in claim 1, the ratchet means comprising a multi-lobed cam and a ratchet-tooth cam secured together in superposed position on the cable drum, a pawl pivotally secured to the brake drum and having an arm, a roller mounted at the end of said arm and adapted to roll in contact with the lobed cam, an inertia mass on the pawl, and a spring for pressing the roller on the cam, the pawl being adapted to engage the teeth of the ratchet cam when the rotational speed of the cable drum exceeds the speed at which the roller can follow the contour of the lobed cam to lift the pawl from engagement with the ratchet cam.

3. In a safety device as claimed in claim 1, the lever means for engaging the spiral groove and manual means for disengaging same comprising a pin mounted in the end of the lever and adapted to engage the groove, a spring for normally urging said pin out of the groove, a finger pivoted to the arm and adapted to depress the pin in the groove against the spring, a lock lever adapted to press the finger to a pin-depressing position, flat springs adapted to hold the lock lever, finger and pin depressed, a cam at the inner end of the lock lever, a pin engaging said cam for raising the lever and springs to free the finger and pin, and wrench actuated means for initially moving the cam pin to free the groove-engaging lever and to control the said lever and associated brake shoes.

JOSEPH TROUIN.

REFERENCES CITED

The following references are of record in the file of this patent:

UNITED STATES PATENTS

| Number | Name | Date |
|---|---|---|
| 695,001 | Sharp | Mar. 11, 1902 |
| 701,094 | Setbacken | May 27, 1902 |
| 870,777 | Harkins | Nov. 12, 1907 |
| 916,823 | Young | Mar. 30, 1909 |
| 1,016,859 | Walters | Feb. 6, 1912 |
| 1,333,530 | Atamian | Mar. 9, 1920 |